United States Patent [19]

Armellin

[11] Patent Number: 5,275,089
[45] Date of Patent: Jan. 4, 1994

[54] AUTOMATIC MACHINE FOR THE PREPARATION OF COFFEE INFUSIONS AND PROCESS FOR OPERATION

[76] Inventor: Hermes Armellin, Chemin du Boisy 10, 1004 Lausanne, Switzerland

[21] Appl. No.: 781,378

[22] Filed: Oct. 23, 1991

[30] Foreign Application Priority Data

Oct. 25, 1990 [CH] Switzerland ............ 3 417/90-0

[51] Int. Cl.⁵ .................................... A47J 31/34
[52] U.S. Cl. ........................... 99/289 R; 99/297; 99/302 P
[58] Field of Search .............. 99/289; 426/433; 100/247, 248, 249, 251

[56] References Cited

U.S. PATENT DOCUMENTS

| | | | |
|---|---|---|---|
| 3,565,641 | 2/1971 | King | 99/302 P |
| 3,760,712 | 9/1973 | Rossi | 99/289 |
| 4,110,221 | 8/1978 | Moser | 99/302 R |
| 4,491,063 | 1/1985 | Grossi | 99/289 R |
| 4,681,028 | 8/1987 | Schmed et al. | 99/802 R |
| 4,852,472 | 8/1989 | In-Albon et al. | 99/302 P |
| 4,936,199 | 6/1990 | Ruggin et al. | 99/287 |
| 4,941,399 | 7/1990 | Zucchetti | 99/302 P |

FOREIGN PATENT DOCUMENTS 2006930 10/1970 Fed. Rep. of Germany .... 99/289 R

Primary Examiner—Robert W. Jenkins
Assistant Examiner—Reginald L. Alexander
Attorney, Agent, or Firm—Kane, Dalsimer, Sullivan, Kurucz, Levy, Eisele & Richard

[57] ABSTRACT

It comprises at least one unit formed by a piston and by a cylindrical chamber, as well as means for supplying with ground coffee and with hot water under pressure, and means for the automatic starting and stopping of the unit and its means of supply. The piston (2) is fixed and the chamber (11, 16) is movable, both arranged horizontally. The chamber is formed by two juxtaposed cylindrical parts, the first part (11) accommodating in rest position the head (3) of the piston (2) fitted with an annular seal (6), has a diameter smaller than the diameter of the seal (6). The second part (16) of the cylindrical chamber has an inner diameter smaller than the outer diameter of the seal (6) permitting sealed sliding. The first part (11) houses a free sleeve (10) the inner diameter of which is equal to the inner diameter of the second part (16) so as to protect the seal when the head (3) passes in front of a lateral opening (13) for supplying ground coffee.

11 Claims, 3 Drawing Sheets

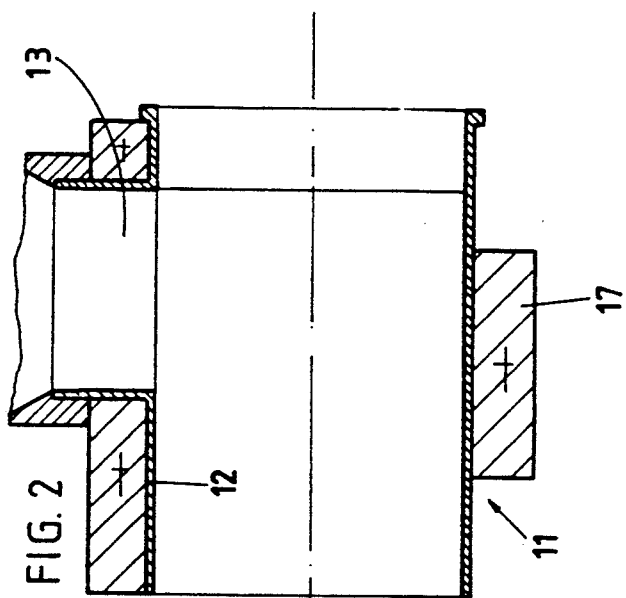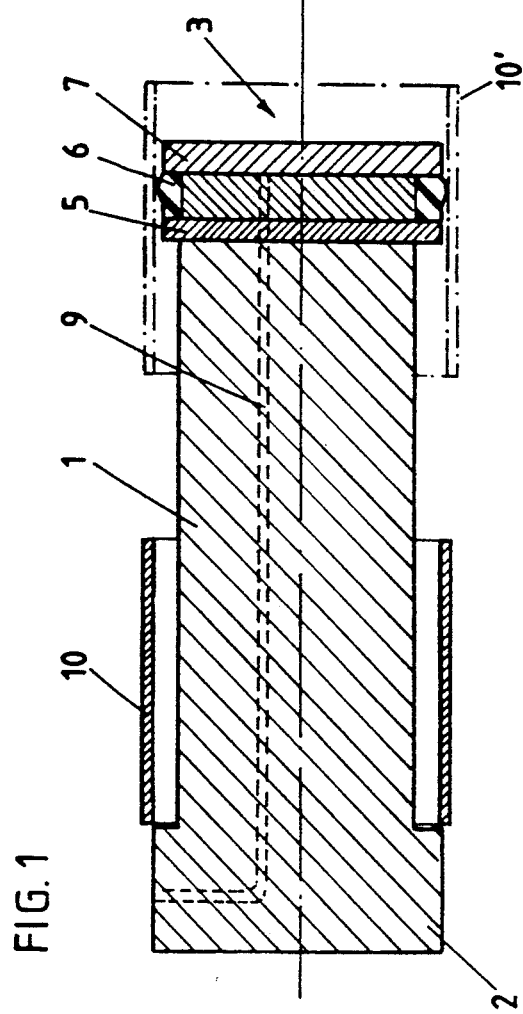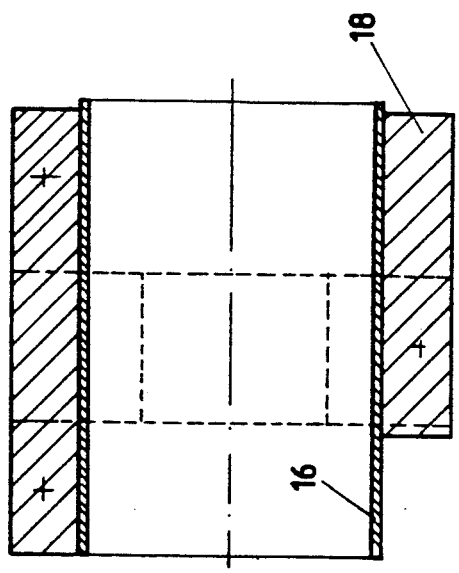

AUTOMATIC MACHINE FOR THE PREPARATION OF COFFEE INFUSIONS AND PROCESS FOR OPERATION

The present invention relates to an automatic machine for the preparation of infusions of coffee, particularly of the espresso type, comprising essentially at least one unit formed by a piston and by a cylindrical chamber, means for supplying said unit with ground coffee and with hot water under pressure, means for the automatic starting and stopping of said unit and its means of supply.

Automatic machines for the making of an infusion of coffee are of two types:

machines using soluble coffee, that is to say that when one presses a button, a cup, as a rule of plastic, leaves the machine with a quantity of soluble coffee and then hot water or hot water with milk comes to be added;

machines which prepare an infusion of coffee of the espresso type which appeared some years ago; in these machines, a quantity of ground coffee has to be compressed and infused to obtain a coffee of the espresso quality.

These latter machines form the subject of the present invention.

These machines encounter a certain number of problems in providing infusions of coffee of the espresso type of good quality. In fact, in order for the aroma of the coffee to be preserved, it is necessary for the coffee to be freshly ground. This problem is in any case partially solved by the use of the automatic mill built into such a machine, which allows the coffee to be ground at the time when the button is pressed in order to obtain the infusion or between the preparation of two coffees so as to have a measure of ground coffee in reserve in order to accelerate the process of making the infusion of coffee.

A second problem is that of compacting the coffee powder before infusing it. This problem is solved by the use as in the first manual machines of the espresso type of a unit formed by a piston and by a cylindrical chamber into which the ground coffee is introduced. Here again, the arrangement and construction of the cylindrical chamber and of the piston are important because after making of the coffee, it is necessary that the coffee grounds can be discharged.

Another problem is that of making two infusions of coffee simultaneously. Most machines solve this type of problem by increasing the quantities of coffee and water introduced into the chamber. Nevertheless, this is not the optimum solution as it has been proved that the quality of the coffee infusion is optimum when the depth of the compacted coffee has a predetermined value. The act of increasing this depth so as to obtain two infusions of coffee has a negative influence on the taste of the coffee.

Finally, a third problem is that certain users require an infusion of coffee with a minimum of liquid and others wish to have more liquid. This problem is solved by most manufacturers by offering on their machines two or three keys which correspond to different quantities of water, this water passing under pressure through the compressed coffee. Here again, this is not the optimum solution as it has been proved that in order to obtain the best taste of a coffee, an optimum quantity of water must infuse through a given quantity of coffee and if one goes beyond, other components are extracted from the coffee such as tannin, etc. which impair the taste and which also lengthen the operation of making the infusion.

In certain of these machines, the cylindrical chamber is supplied with ground coffee through a lateral opening of the chamber. The piston with its seal, which is in close and tight contact with the inner wall of the chamber, at the place of the opening for the introduction of the coffee is no longer in contact over a part of its periphery with the wall, this allowing the seal to slacken and consequently the lips of the opening damage the seal, when it passes forwards and backwards. It is necessary to replace the seal after a relatively short use.

The aim of the present invention is to propose an automatic machine for the preparation of infusions of coffee whereby the abovementioned disadvantages can be mitigated.

The automatic machine according to the invention is characterized by the fact that the piston is fixed and the chamber movable and that they are arranged horizontally, that the chamber is formed by two juxtaposed cylindrical parts, the first part, housing in rest position the head of the piston fitted with an annular seal, has a diameter smaller than the diameter of the seal of the head of the piston, the second part of the cylindrical chamber has an inner diameter smaller than the outer diameter of the seal permitting a sealed sliding between the piston and the second part of the chamber, that in the first part is housed a free sleeve the inner diameter of which is equal to the inner diameter of the second part and the length of which is smaller than the length of the first part, that the first part is provided with a lateral opening for supplying ground coffee, said opening being situated on the half of the first part close to the second part.

The advantages of the machine according to the invention are aB follows: the fact that the piston is fixed and the chamber movable and particularly the fact that the chamber is in two parts has the aim of permitting easy ejection of the coffee grounds after making of the infusion. Moreover, the sleeve located in the first part provides protection for the piston head seal when the piston passes in front of the opening for introduction of the coffee. In fact, the movement of this sleeve being free in the first part and its inner diameter being smaller than the outer diameter of the seal when the chamber comes against the piston, the sleeve surrounds the piston up to the step created between the first and the second part of the chamber. In this manner, the seal is protected and does not come to rub against the lips of the opening for supplying with ground coffee and, in another respect, the seal is not soiled by any coffee grains which may remain or fall from the outlet from the coffee mill.

According to a variant embodiment, the coffee machine is equipped with a second unit formed by a piston and by a cylindrical chamber the diameter of which is greater than that of the first in order to permit the simultaneous making of two infusions of coffee while keeping the thickness of the pellet of coffee grounds the same as that of the first unit while having at least approximately twice the volume.

According to a preferred variant, the filter, arranged in the second part of the chamber against which the ground coffee is pressed and through which the infusion passes, is provided with a guide rod parallel to the axis of the chamber and passing through a plug fixed against the downstream end of the chamber. A spring is arranged between the plug and the filter tending to return the filter towards the inside of the chamber. The arrangement of the spring between the filter and the plug makes it possible to exert, when compressing the coffee grounds, an almost constant pressure even if the thickness of the pellet of coffee is changed to take into account, for example, atmospheric conditions or the quality of the coffee, etc.

By means of an end-of-travel stop, the filter with the guide rod is used for the expulsion of the coffee grounds after making of the infusion.

According to a preferred variant, the coffee machine is fitted with a device permitting the addition of hot water in adjustable quantity at the infusion outlet so as to increase the quantity of the liquid found in the cup without this extra water passing through the compressed coffee powder, which would have the effect of extracting other substances such as tannin etc., impairing the taste of the coffee.

The present invention also relates to a process for operation of the coffee machine as defined by claim 6.

A very important characteristic of this operation is that consisting, before completely compressing the coffee in the cylindrical chamber, in wetting it with hot water under the normal pressure of the water supply system, so that the coffee is well wetted, and afterwards in compressing the coffee and in submitting it to the passage of hot water under a much higher pressure. In this way, maximum aroma and taste come to be extracted from a quantity of ground coffee.

The invention will be described in greater detail with the help of the attached drawing.

FIG. 1 is an axial sectional view of the piston.

FIGS. 2 and 3 are axial sectional views of two parts of the cylindrical chamber.

Figure 4:
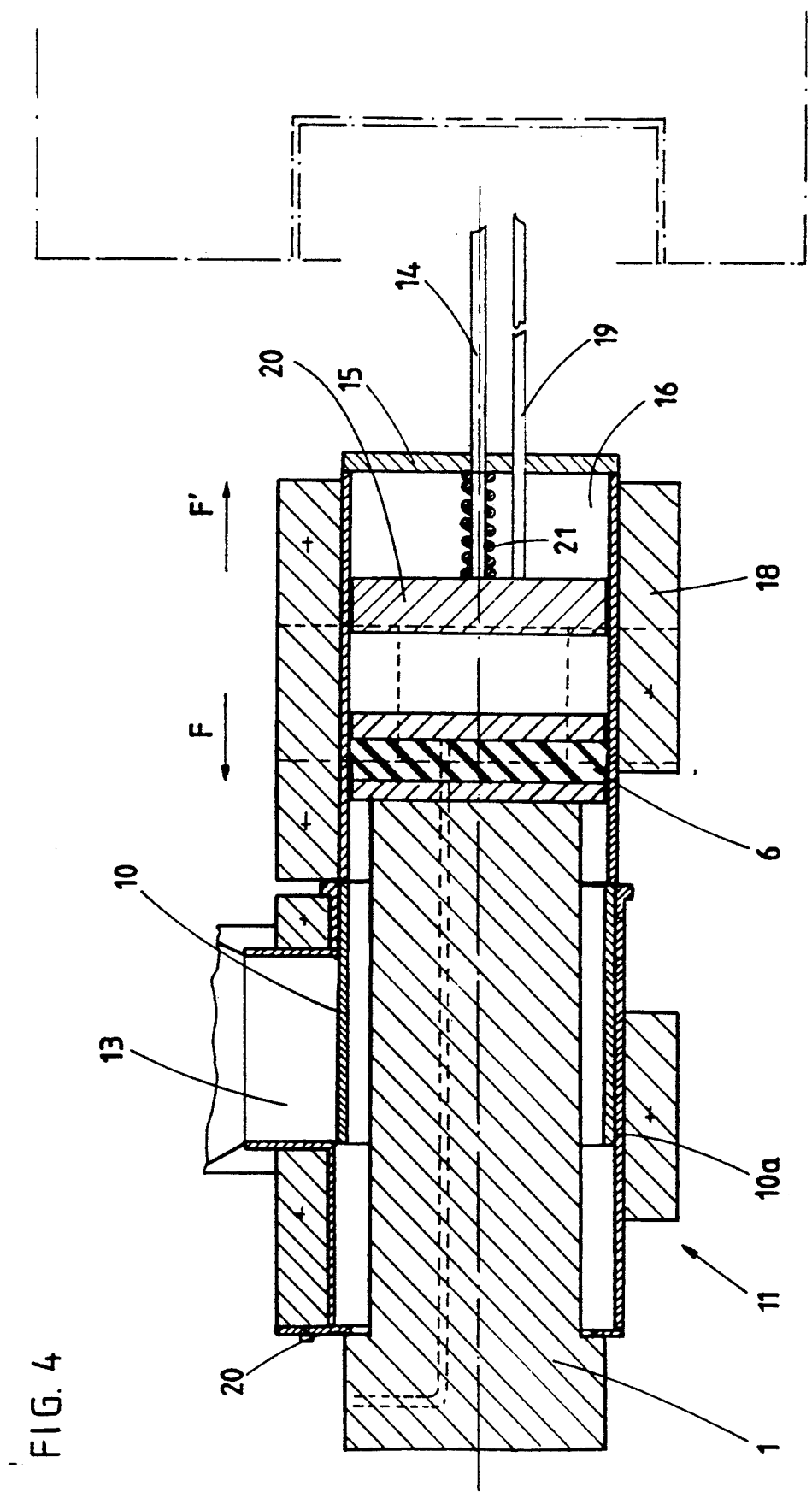
FIG. 4 is a sectional view of the piston-cylindrical chamber unit, the chamber being at the end of its travel in position for making of the infusion.
Figure 5:
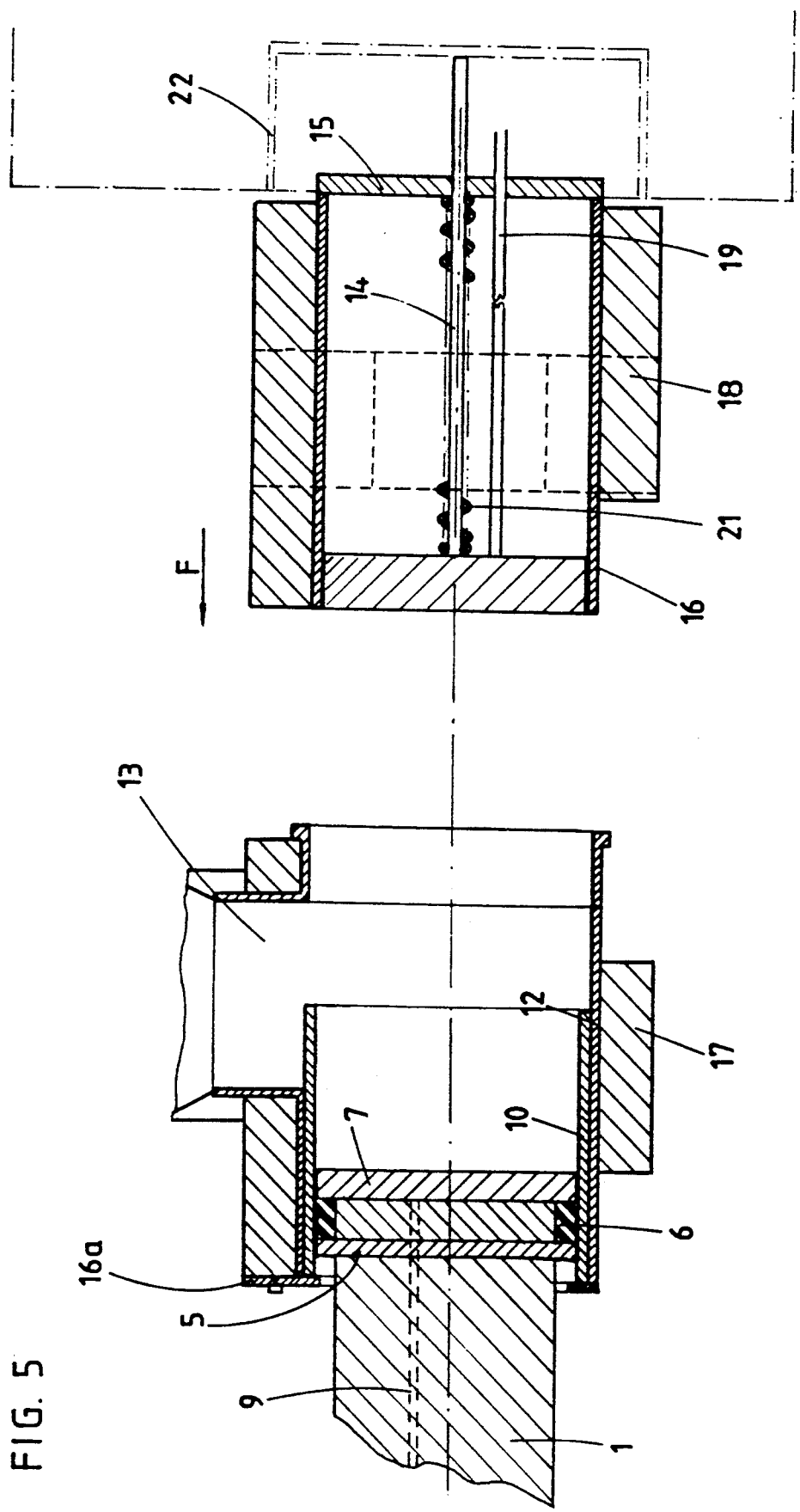
FIG. 5 is an axial sectional view of the piston-cylindrical chamber unit in rest position, that is to say on stand-by for the start of the cycle of the preparation of an infusion of coffee.

The automatic machine for the preparation of infusions of coffee is housed in a frame, not shown in the drawing, and it is fitted with two piston-cylindrical chamber units only one of which will be described below. One is adapted to the preparation of one cup of coffee infusion, while the second is adapted to the preparation of two cups of coffee infusions simultaneously. The frame also houses an electric mill for grinding the coffee and supplying each of the cylindrical chambers of two units. Such a mill may advantageously be the mill forming the subject of the same applicant's Swiss patent application bearing the number 4 577/89-0. Of course, any other coffee mill may perform the function of supplying coffee. The machine is also fitted with a pump for the sending of hot water under pressure as will be seen below, and also a heating unit to bring water from the system up to the temperature required for the infusion of coffee. Various electronic devices known in themselves are used in order to regulate:

the quantity of ground coffee necessary for one of two measures;

the quantity of hot water intended to pass through the compacted coffee inside the cylindrical chamber;

so as to control the successive moving and stopping of the cylindrical chamber, and also a means ensuring that the coffee grounds ejected at the end of the preparation of an infusion do not remain between the two parts of the chamber (FIG. 5).

The control panel for the user of the machine comprises three buttons per piston-cylindrical chamber unit, one button for the delivery of a small coffee, one button for the delivery of a medium coffee and one for a large coffee. For the second unit, there is one button for the delivery of two small, medium and large coffees respectively. We shall explain later how the coffees termed medium and large are obtained. And finally a third series of three buttons enables the switching on of both units to be ordered for the making of three coffees simultaneously.

We shall now describe the various elements of a unit formed by a piston and by a cylindrical chamber.

FIG. 1 shows a piston 1 which will be fixed against the framework of the assembly formed by the two units and the mill of the machine, by its posterior part 2 by means of screws or similar means. The anterior part of the piston terminates with a head 3, which in this case is formed by a ring 5 of diameter greater than the main body of the piston 1, followed by a packing ring 6 for sealing and lastly by an annular part 7 surrounding a filter having the form of a shower head through which the hot water will f low brought by a duct 9 passing through the body of the piston 1 and connected to the hot water supply of the machine. Around the piston 1 is located a free sleeve 10 the inner diameter of which is equal to or even slightly smaller than the outer diameter of the seal 6 so that there is a sealed contact with the sleeve 10, as shown chain-dotted and referenced 10'.

FIGS. 2 and 3 show the cylindrical chamber which is formed by two parts. A first part 11 formed by a cylindrical part 12, the diameter of which is slightly greater than the outer diameter of the sleeve 10 and which is provided with a lateral opening 13 adapted for the admission of the ground coffee into the chamber.

The second part of the cylindrical chamber is formed by a cylinder 16 the inner diameter of which is smaller than the outer diameter of the seal 6. The first cylindrical part 11 and the second part are each surrounded by a block, 17 and 18 respectively, made of a light alloy.

The movement of two cylindrical parts of the chamber is obtained by means of a jack, for example formed by an endless screw acting on one or several nuts securely attached to the block 17. A rod securely attached to the block 16 (sic) slides in a recess of the block 18 and it is fitted with a head, at the end situated in this recess so as to be capable of bringing the first part back to its initial position during the return of the second part 16. Any other means may of course be used within the spirit of the present invention. The object of the blocks surrounding the cylindrical parts of the chambers is also to enable said chambers to be kept at a temperature higher than the ambient temperature so that when the infusion of coffee is run off, the liquid is not cooled, means for heating being provided to this effect.

FIG. 4 shows the unit of the piston 1 and of the cylindrical chamber formed by two parts 11 and 16 in closed position, that is to say in position for making of an infusion of coffee. The sleeve 10 may be seen which closes the opening 13 for the admission of the coffee of the first part 11 of the cylindrical chamber. The head of the piston is situated inside the second part of the cylindrical chamber and compresses the ground coffee against a filter 20 connected by a duct 19 to the outside of the machine for running off of the infusion. A guide rod 14 is securely attached to the filter 20 and passes through a plug 15 closing the end and (sic) the second part 16. A spring 21 pressing against the plug 21 (sic) and the filter 20 returns the latter towards the interior of the chamber. An end-of-travel stop 22 securely attached to the framework of the machine serves, when the part 16 is returned, to block the filter 20 in a precise position, this enabling the grounds of infused coffee to be discharged during the complete backward movement of the part 16 (FIG. 5).

A relatively important element of the present invention is the sleeve 10 the existence of which enables the seal 6 of the head of the piston to be protected during the passage of the head of the piston under the opening 13 of the cylindrical chamber. In fact, during the passage of the head at the place of the opening 13, the seal 6 in rubbing against the lips of the opening 13 could be torn, or even soiled by grains of coffee, all the more so because the part of the seal which is no longer in contact with the chamber slackens into said opening 13.

In the initial position (see FIG. 5), that is to say when the chamber is situated fully to the right of the figure, the head 3, and particularly the seal 6, are situated inside the sleeve 10 and any movement of the part 11 of the cylindrical chamber with respect to the head of the piston 3 leaves the sleeve 10 free to cover the head of the piston, this being true until the second part 16 of the cylindrical chamber, the inner diameter of which is smaller than that of the sleeve, comes to butt against the sleeve 10. From that moment on, the movement of the chamber in the direction of the arrow F has the effect of driving the sleeve 10 in the direction F and of causing it to slide onto the seal 6 enabling the seal 6 to enter into close contact with the interior of the second cylindrical part 16 so as to compress in sealed manner the ground coffee.

With the help of FIG. 5 we shall explain the operation of the coffee machine in connection with the unit formed by the piston and by the cylindrical chamber. This explanation will also enable the process for operation of the machine to be described.

In rest position the piston 1 and the two parts 11 and 16 of the cylindrical chamber occupy the position as shown in FIG. 5. When the start button is pressed asking for an infusion of coffee to be made. (sic) The second part 16 of the chamber advances until it comes into contact with the first part 11 of the cylindrical chamber. At that moment, the ground coffee falls through the aperture 13 in the chamber, sent by the coffee mill and its distributor located above or any other reservoir provided for this purpose. After the coffee has fallen and, as a rule two seconds after the initial stopping of the second part of the chamber, both parts of the chamber move towards the piston 1, this causing the closure of the opening 13 by the sleeve 10, as shown in FIG. 4.

The movement continues as far as a position of 6 or 7 mm before complete compression of the coffee and everything stops for a period of about three seconds. During this time a small quantity of hot water under the normal pressure of the supply system is sent through the duct 9 in order to wet the not fully compressed coffee so that the maximum aroma can be extracted from it afterwards.

After having wetted the coffee for a period of about three seconds the admission of water is stopped and both parts of the chamber move again by a few millimeters so as to compress the pellet of coffee to the maximum extent between the head 3 of the piston and the filter 20. At that moment hot water under pressure supplied by the electric pump of the machine is sent through the same duct 9 in order to make the infusion which flows through the channel 19 towards the outside of the machine. When the quantity of water preset and optimized when the machine is started up has been used, both parts of the chamber return to their initial position as shown in FIG. 5. During the backward movement of the part 16, the part 11 and the block 17 follow, driven by the rod (not shown) sliding in the recess of the block 18, when the head of the rod comes into contact with the end of said recess. When the rod 14 securely attached to the filter 20 comes to butt against the stop 22, the process of discharging of the coffee grounds starts while the part 16 continues to move backwards. When the filter 20 arrives at the position shown in FIG. 5, the grounds fall by gravity into an appropriate container. To ensure that the pellet of coffee grounds does not remain stuck against the filter 20, a pin (not shown) passes in front of the end of the part 16 so as to push any grounds which might still be stuck.

During the backward movement of the chamber and when the second part 16 of the chamber leaves the head 3 of the piston and more precisely the seal 6, there is a contact with the edge of the sleeve 10 and a stop 16a formed by a ring or other means, fixed against the first part 16 of the chamber (FIG. 5). From that moment on, the sleeve 10 is driven with the chamber in the direction F', this having the effect of forcing the sleeve 10 to surround the piston head until the ring 5 of this piston comes into contact with the stop 16a which corresponds to the end of the return travel of both chamber parts.

It is important to emphasize here that for the making of two cups of coffee simultaneously and given that the depth of the pellet of ground coffee must not be greater than a predetermined value, the inventor has chosen to increase the diameter of the pellet by providing a second piston-cylindrical chamber unit of the same design as that described here, but of greater diameter, so as to allow the simultaneous making of two infusions which will flow from a double channel into two cups.

It has been proved that in order to obtain the best quality for a given quantity of coffee, a certain maximum quantity of water must pass through the compressed coffee. Any additional quantity only has the effect of extracting harmful substances such as tannin and impairing the taste of the coffee. For this reason, the inventor has provided a device which adds hot water at the outlet from the channel 19 for coffees termed "medium" and "large". Thus, when somebody wishes to obtain a coffee with more liquid, he operates the corresponding button and while the electric pump is sending, in the last phase of the making of the infusion, hot water under pressure the quantity of which is always the same for a quantity of ground coffee, additional hot water runs off close to the outlet channel of the infusion and this, on the one hand, satisfies the consumer since he obtains a coffee with more liquid and, on the other hand, does not impair the taste of the coffee since the optimum quantity of water has been used for making of the infusion.

It should be emphasized that the spring 21 ensures that the pressure exerted on the ground coffee is always constant even if there is a change in the quantity of ground coffee, change rendered necessary to take account of the weather conditions, of the quality of the coffee, etc.

I claim:

1. Automatic machine for the preparation of infusions of coffee comprising:
   - a first unit including a fixed piston having a piston head with a piston head diameter and a chamber movable about said piston;
   - a coffee supply for supplying coffee grounds;
   - said chamber being formed of a first chamber part and a second part;
   - said first part having a lateral opening and a free sleeve having a diameter no greater than said piston head diameter, said sleeve being in sliding engagement with said piston, wherein said first part is movable between a first position wherein said lateral opening is open to receive grounds from said coffee supply into said first part in front of said piston with said sleeve positioned over said piston for protecting said piston from said grounds, and a second position wherein said lateral opening is closed by said free sleeve;
   - said second part having a second part inner diameter no larger than said piston head diameter, said second part being arranged and constructed to receive said grounds from said first part by moving over said piston and to compress said ground against said piston; and
   - hot water supply means for supplying hot water to said grounds, after said ground have been compressed in said second part.

2. The machine of claim 1 further comprising means for moving said chamber axially with respect to said piston.

3. The machine of claim 1 wherein said first unit is sized and shaped to make one cup of coffee at a time, further comprising a second unit sized and constructed to make two cups of coffee at a time.

4. The machine of claim 1 wherein said second part includes a filter having a first position in which said filter cooperates with said piston head to compress said grounds while said grounds are exposed to said hot water; said filter being movable toward a second position for discharging coffee grounds form said chamber; a guide rod for moving said filter between said first and second positions, and an outlet duct receiving coffee from said filter.

5. The machine of claim 4 wherein said second part includes biasing means for biasing said filter toward said second position.

6. The machine of claim 1 further comprises hot water control means for infusing a fixed volume of hot water to said unit and to provide a selectable amount of hot water for mixing with coffee from said unit.

7. A machine for making coffee comprising:
   - a hot water supply;
   - a fixed piston with piston head;
   - a movable chamber having a first cylindrical part having an inlet, and a sleeve slidable over said piston and being axially movable over said piston between a first position in which coffee grounds are accepted through said inlet into said first cylindrical part and a second position in which said inlet is closed by said sleeve; and a second cylindrical part having an open end and a filter with said second part being slidable over said filter;
   - an outlet for delivering coffee; and
   - moving means for moving said first part; said parts and piston cooperating to make coffee by receiving coffee grounds in said first part through said inlet with said sleeve being positioned over said piston head to protect said piston head from said grounds, moving said chamber with respect to said fixed piston to compress said ground between said piston head and said filter in said second part and injecting hot water into the compressed grounds.

8. The machine of claim 7 wherein second part is movable by said moving means between a first position in which second part open end abuts said first part to receive coffee grounds from said first part, and a second position in which said open end is removed form said first part to allow coffee grounds to be discharged from said second part.

9. The machine of claim 8 wherein said filter is axially movable in said second cylindrical part for selectively discharging said coffee grounds.

10. The machine of claim 7 wherein said chamber is movable along a horizontal axis.

11. The machine of claim 7 wherein said sleeve is disposed between said piston head and said inlet when said first part is in said first position.

* * * * *

UNITED STATES PATENT AND TRADEMARK OFFICE
CERTIFICATE OF CORRECTION

PATENT NO. : 5,275,089
DATED : Jan. 4, 1994
INVENTOR(S) : Ermes Armellin

It is certified that error appears in the above-identified patent and that said Letters Patent is hereby corrected as shown below:

On the title page, item [76] Inventor: change the inventor's first name from "Hermes" to --Ermes--.

Signed and Sealed this

Twenty-second Day of July, 1997

Attest:

BRUCE LEHMAN

Attesting Officer

Commissioner of Patents and Trademarks